(12) United States Patent
Lee

(10) Patent No.: US 11,645,125 B2
(45) Date of Patent: May 9, 2023

(54) METHOD AND APPARATUS FOR EXECUTING WORKFLOW INCLUDING FUNCTIONS WRITTEN IN HETEROGENEOUS PROGRAMING LANGUAGE

(71) Applicant: SAMSUNG SDS CO., LTD., Seoul (KR)

(72) Inventor: Joon Hyung Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 466 days.

(21) Appl. No.: 16/711,860

(22) Filed: Dec. 12, 2019

(65) Prior Publication Data

US 2020/0379821 A1     Dec. 3, 2020

(30) Foreign Application Priority Data

May 28, 2019     (KR) .................. 10-2019-0062526

(51) Int. Cl.
*G06F 9/46* (2006.01)
*G06F 9/54* (2006.01)
*G06F 16/25* (2019.01)

(52) U.S. Cl.
CPC ............... *G06F 9/541* (2013.01); *G06F 9/46* (2013.01); *G06F 16/258* (2019.01)

(58) Field of Classification Search
CPC ........... G06F 9/541; G06F 9/46; G06F 16/258
USPC ........................................................ 718/102
See application file for complete search history.

(56) References Cited

U.S. PATENT DOCUMENTS

| | | | |
|---|---|---|---|
| 7,886,264 B1 | 2/2011 | Peyton et al. | |
| 9,563,478 B1 * | 2/2017 | Miller | G06F 9/5038 |
| 2006/0070044 A1 | 3/2006 | Romanovski et al. | |
| 2016/0306678 A1 * | 10/2016 | Hira | G06F 9/5083 |
| 2017/0090882 A1 * | 3/2017 | Kobayashi | G06F 8/35 |

FOREIGN PATENT DOCUMENTS

| | | | |
|---|---|---|---|
| CN | 109189750 A | * | 1/2019 |
| EP | 3267310 A1 | | 1/2018 |
| JP | 2005-326909 A | | 11/2005 |
| KR | 10-1408280 B1 | | 6/2014 |
| KR | 10-1422737 B1 | | 7/2014 |

(Continued)

OTHER PUBLICATIONS

English Translation of CN-109189750-A (Year: 2019).*

(Continued)

*Primary Examiner* — Bradley A Teets
(74) *Attorney, Agent, or Firm* — The PL Law Group, PLLC

(57) ABSTRACT

A method and device for executing a workflow includes functions written in a heterogeneous programming language. The method for executing heterogeneous language functions includes obtaining a workflow that includes a call for a first function written in a first programming language and a call for a second function written in a second programming language, wherein input data of the second function includes output data of the first function, and setting, in response to completing execution of the first function, the output data of the first function in a format capable of being processed in the second programming language.

12 Claims, 15 Drawing Sheets

(56) References Cited

FOREIGN PATENT DOCUMENTS

KR   10-2018-0121732 A    11/2018
WO   WO-2019032123 A1 *  2/2019  ............... G06F 8/51

OTHER PUBLICATIONS

European Search Report For EP20158806.8 dated Oct. 12, 2020 from European patent office in a counterpart European patent application.
Office action dated Jun. 8, 2022 from European Patent Office in a counterpart European Patent Application No. 20158806.8.
Shawn Bowers et al., "Actor-Oriented Design of Scientific Workflows", 2005,Conceptual Modeling—ER 2005, Lecture Notes in Computer Science; LNCS, Springer, Berlin, DE, pp. 369-384, XP019021937, ISBN: 978-3-540-29389-7.

* cited by examiner

| Function Category | spark |
|---|---|
| Function Name | Function1 |
| Function Id | Function_Id_1 |
| Parameter | param1 |

| Function Category | python |
|---|---|
| Function Name | Function2 |
| Function Id | Function_Id_2 |
| Parameter | paramA |
| | paramB |
| | paramB |

```
{
   id: Workflow1,
   entries: [Function1],
   nodes: [
     {
        id : Function_Id_1, context: spark, outputs: "", params: {
           param1: ""
        }
     },
     {
        id : Function2,  context: python, inputs: "",  outputs: "", params: {
          paramA: "",
          paramB: "",
          paramC: ""
        }
     }
   ],
   links: [
        { id : L1, source  : Function1, target: Function2 }
   ]
}
```

| column_name | species | max | min | avg | variance | stddev | q1 | q3 |
|---|---|---|---|---|---|---|---|---|
| petal_length | setosa | 1.9 | 1 | 1.462 | 0.030159 | 0.173664 | 1.4 | 1.575 |
| petal_length | versicolor | 5.1 | 3 | 4.26 | 0.220816 | 0.469911 | 4 | 4.6 |
| petal_length | virginica | 6.9 | 4.5 | 5.552 | 0.304588 | 0.551895 | 5.1 | 5.875 |
| petal_width | setosa | 0.6 | 0.1 | 0.246 | 0.011106 | 0.105386 | 0.2 | 0.3 |
| petal_width | versicolor | 1.8 | 1 | 1.326 | 0.039106 | 0.197753 | 1.2 | 1.5 |
| petal_width | virginica | 2.5 | 1.4 | 2.026 | 0.075433 | 0.27465 | 1.8 | 2.3 |
| sepal_length | setosa | 5.8 | 4.3 | 5.006 | 0.124249 | 0.35249 | 4.8 | 5.2 |
| sepal_length | versicolor | 7 | 4.9 | 5.936 | 0.266433 | 0.516171 | 5.6 | 6.3 |
| sepal_length | virginica | 7.9 | 4.9 | 6.588 | 0.404343 | 0.63588 | 6.225 | 6.9 |
| sepal_width | setosa | 4.4 | 2.3 | 3.428 | 0.14369 | 0.379064 | 3.2 | 3.675 |
| sepal_width | versicolor | 3.4 | 2 | 2.77 | 0.098469 | 0.313798 | 2.525 | 3 |
| sepal_width | virginica | 3.8 | 2.2 | 2.974 | 0.104004 | 0.322497 | 2.8 | 3.175 |

METHOD AND APPARATUS FOR EXECUTING WORKFLOW INCLUDING FUNCTIONS WRITTEN IN HETEROGENEOUS PROGRAMING LANGUAGE

CROSS-REFERENCE TO RELATED APPLICATION

This application claims priority from Korean Patent Application No. 10-2019-0062526 filed on May 28, 2019 in the Korean Intellectual Property Office, and all the benefits accruing therefrom under 35 U.S.C. 119, the contents of which in their entirety are herein incorporated by reference.

BACKGROUND

1. Technical Field

The inventive concept relates to a method and device for executing a workflow including functions written in a heterogeneous programming language. More specifically, the inventive concept relates to a method and device for seamlessly executing a workflow including heterogeneous language functions in one task.

2. Description of the Related Art

Even though functions have the same function, technical features of each of a plurality of programming languages are different. Therefore, a language that may derive the optimal performance and result by using the function depending on data characteristics and the analysis purpose. However, since the plurality of programming languages have different grammar and execution contexts, data model analysts have no choice but to use a language that may be handled skillfully.

In addition, there is a limitation that the entire workflow cannot be compiled in one task even if a workflow using functions written in several programming languages is created on a single programming board because a compiling manner is different for each programming language.

SUMMARY

Aspects of the inventive concept provide a method and device for executing a workflow including a plurality of functions written in a heterogeneous programming language in one task.

Aspects of the inventive concept also provide a method and device for minimizing an execution time of a workflow written in a functional unit of a function.

However, aspects of the inventive concept are not restricted to those set forth herein. The above and other aspects of the inventive concept will become more apparent to one of ordinary skill in the art to which the inventive concept pertains by referencing the detailed description of the inventive concept given below.

According to an aspect of the inventive concept, there is provided a method for executing heterogeneous language functions, the method being performed by a computing device, and comprises obtaining a workflow that includes a call for a first function written in a first programming language and a call for a second function written in a second programming language, wherein input data of the second function includes output data of the first function and setting, in response to completing execution of the first function, the output data of the first function in a format capable of being processed in the second programming language.

According to another aspect of the inventive concept, there is provided a method for executing heterogeneous language functions, the method being performed by a computing device, and comprises obtaining a workflow defined to perform a plurality of functional units in sequence, wherein each functional unit included in the plurality of functional units corresponds to a plurality of candidate functions implemented in different programming languages and executing the workflow by selecting an optimal combination among all possible combinations of the candidate functions for execution of the workflow.

According to still another aspect of the inventive concept, there is provided a computing device, comprises a memory into which a heterogeneous function execution program is loaded and a processor that executes the heterogeneous language function execution program loaded into the memory, wherein the heterogeneous language function execution program comprises: an instruction to obtain a workflow defined to perform a plurality of functional units in sequence, wherein each functional unit included in the plurality of functional units corresponds to a plurality of candidate functions implemented in different programming languages and an instruction to execute the workflow by selecting an optimal combination among all possible combinations of the candidate functions for execution of the workflow.

BRIEF DESCRIPTION OF THE DRAWINGS

The above and other aspects and features of the inventive concept will become more apparent by describing in detail exemplary embodiments thereof with reference to the attached drawings, in which:

FIG. 4 is a view for illustrating a method for storing a relationship between heterogeneous language functions in the method for executing the heterogeneous language functions according to another embodiment of the inventive concept;

DETAILED DESCRIPTION

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

Hereinafter, some embodiments of the inventive concept will be described with reference to the drawings.

Figure 1:
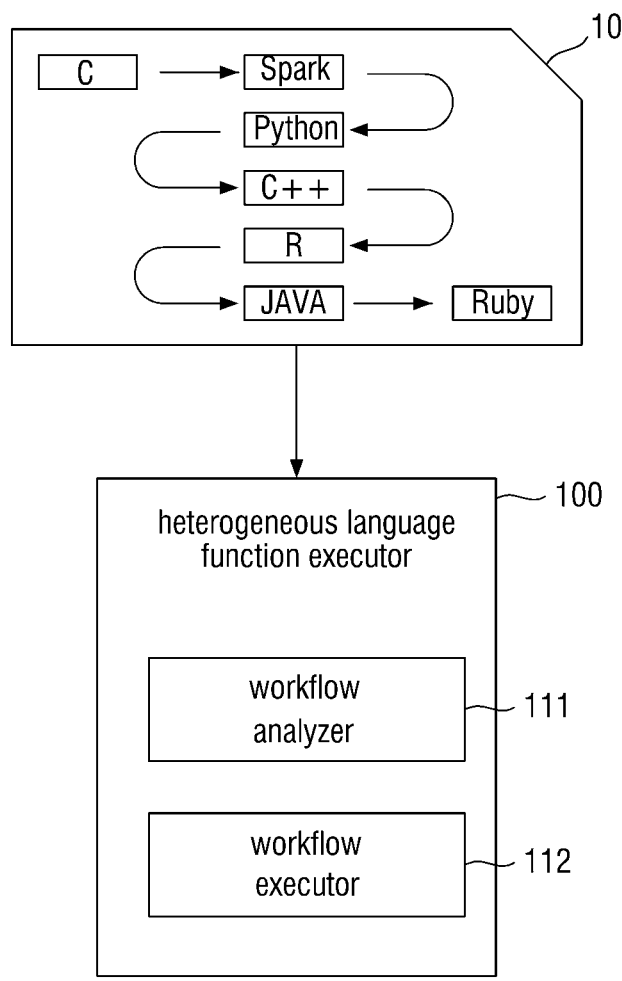
FIG. 1 is a conceptual diagram for illustrating a system for executing heterogeneous language functions according to an embodiment of the inventive concept.

Hereinafter, a system for executing heterogeneous language functions according to an embodiment of the inventive concept will be described with reference to FIG. 1. A program 10 having one workflow may be composed of a plurality of functions written in various programming languages. Since each programming language has a different configuration scheme for a data set, there is a limit in data transfer between functions written in heterogeneous languages. Conventionally, the data transfer between the heterogeneous functions has been performed using an external storage medium such as a file or a database. However, the use of such an external storage medium is a cause of performance degradation of the program, and it is essential to develop a separate application program that connects functions developed in each language.

A heterogeneous language function executor 100 according to some embodiments of the inventive concept may executes all functions written in a plurality of heterogeneous languages in one task without a separate application program and a device for converting a data set for connecting between the heterogeneous language functions. A workflow analyzer 111 may analyze a programming language having a minimum execution time for each function by analyzing the workflow. The workflow analyzer 111 according to another embodiment may store and manage a relationship between a function included in the workflow and the plurality of functions.

In addition, the workflow executor 112 according to an embodiment may convert output data of a first function and transfer it as input data of a second function when a workflow including the first function and the second function is executed. The workflow executor 112 according to another embodiment may execute a candidate function that minimizes the overall execution time of the workflow among candidate functions in various languages that perform a function of the first function at the time of executing the first function.

This allows model analysts who create workflows to create workflows by focusing on a model's functions and algorithms instead of spending time and money on learning a programming language.

Figure 2:
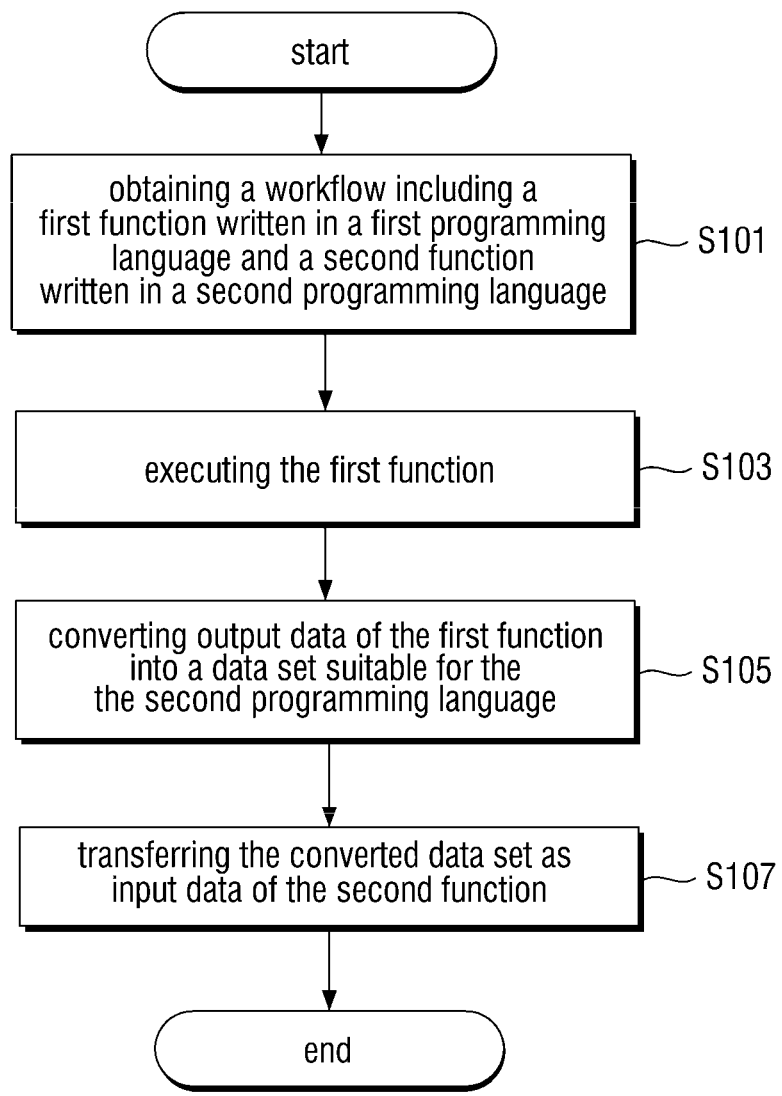
FIG. 2 is a flowchart for illustrating a method for executing heterogeneous language functions according to another embodiment of the inventive concept.

Hereinafter, a method for executing a heterogeneous language function according to another embodiment of the inventive concept will be described in detail with reference to FIG. 2. The method for executing the heterogeneous language function according to the present embodiment may be implemented by a computing device. The computing device may be, for example, the heterogeneous language function executor described with reference to FIG. 1. Hereinafter, each operation of the method for executing the heterogeneous language function according to the present embodiment will be described. It should be noted that in the case where there is no mention of the subject of each operation or expressed passively, the subject is the computing device.

In step S101, a workflow including a first function written in a first programming language and a second function written in a second programming language may be obtained. The first programming language and the second programming language may be different, and the second function may be executed immediately after the execution of the first function. In addition, input data of the second function may be output data of the first function.

In step S103, the first function included in the workflow may be executed. The first function may be automatically executed according to an execution order of the workflow, or may be executed according to a request for executing the first function.

In step S105, the output data of the first function may be converted into a data set of the second programming language. Since programming languages have different configuration schemes for data sets, the data sets may be converted for data transfer between heterogeneous language functions. For example, Spark may configure a data set using an RDD or a Spark Data frame, Python may configure a data set using Pandas or NumPy, and R may configure a data set using an R Data frame.

Specifically, when the output data of the first function written in Spark is transferred to the input data of the second function written in Python, the output data of the first function present in the Spark Data frame may be transferred as Pandas used in the second function by using memory management software or a separate storage space. The memory management software may use a library such as Redis (Remote Dictionary Server) or Memcached, for example. The separate storage space may be utilized by using a file to transfer data. In this case, naturally, a data transfer process is automatically performed by a system without user intervention. It should also be noted that a method for managing a memory according to some embodiments of the inventive concept is not limited thereto and may be any memory management software that may be easily selected and changed by those skilled in the art.

In step S107, the converted data set may be transferred as the input data of the second function. The second function receiving the input data may be automatically executed without a separate user manipulation and a manual data transfer process for executing the second function.

Thus, by setting the output data of the first function to a format that may be processed in a programming language of the second function, a plurality of functions written in heterogeneous languages may be executed in a single task without a user's separate manipulation for continuously executing the heterogeneous language functions.

Hereinafter, a method for storing and managing a workflow composed of a plurality of functions according to some embodiments of the inventive concept will be described in detail with reference to FIG. 3.

A function according to an embodiment of the inventive concept may be stored with information on a language of the function, and in some embodiments, information on a name of the function, an identifier of the function, and parameters may be further stored.

For example, when there is a workflow 203 in which Function 2 202 is executed immediately after execution of Function 1 201, information 211 and 212 about the function 1 and the function 2 may include information on the language of the function, the name of the function, the identifier of the function, and the parameters of the function.

Figure 3:
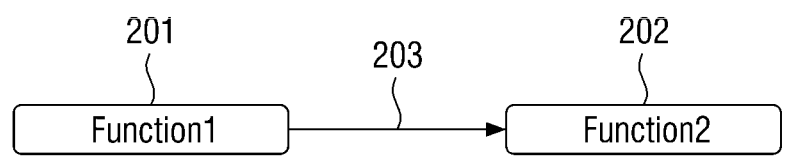
FIG. 3 is a view for illustrating a method for storing heterogeneous language function data in the method for executing the heterogeneous language functions according to another embodiment of the inventive concept.

Referring to the information 211 about Function 1 of FIG. 3, a function category of Function 1 may be Spark, a function name of Function 1 may be Function 1, a function id of Function 1 may be Function_Id_1, and a parameter of Function 1 may be param1. In this case, a data set in Function 1 may be configured by using the data RDD or the Spark Data frame, which is a data frame of Spark, and input data of Function 1 may be a single parameter corresponding to param1.

In addition, referring to the information 212 about Function 2, a function category of Function 2 may be Spark, a function name of Function 2 may be Function 2, a function id of Function 2 may be Function_Id_2, and parameters of Function 2 may be paramA, paramB, and paramC. In this case, a data set in Function 2 may be configured by using Pandas which is a data frame of Python, and input data of the Function 2 may be three parameters corresponding to paramA, paramB, and paramC.

As each function included in the workflow is stored as described above, it is possible to save time and cost for function analysis separately when transferring data between heterogeneous language functions and optimizing the workflow.

Hereinafter, a method for storing a workflow including heterogeneous language functions will be described in detail with reference to FIG. 4.

A workflow may be defined as functions written in heterogeneous languages and relationships among a plurality of functions. Therefore, when storing information on the workflow, information on functions included in the workflow, data transferred between each function, and relationships among the plurality of functions may be further stored.

As shown in FIG. 4, information on the workflow may be stored and transferred in, for example, a JSON format. It should be noted that the JSON format is only an example of a data storage format, and the format for data is not limited thereto. For example, when storing workflow information 220 composed of Functions 1 and 2 of FIG. 3, the information on the workflow may include information on an identifier (id) of the workflow, a starting function (entries) of the workflow, nodes corresponding to each function, and links that store the connection relationships between the functions. For example, it may be seen that an identifier of a link corresponding to a connection relationship between Functions 1 and 2 is L1, a function corresponding to a source node is Function1, and a function corresponding to a destination node is Function2.

Figure 5:
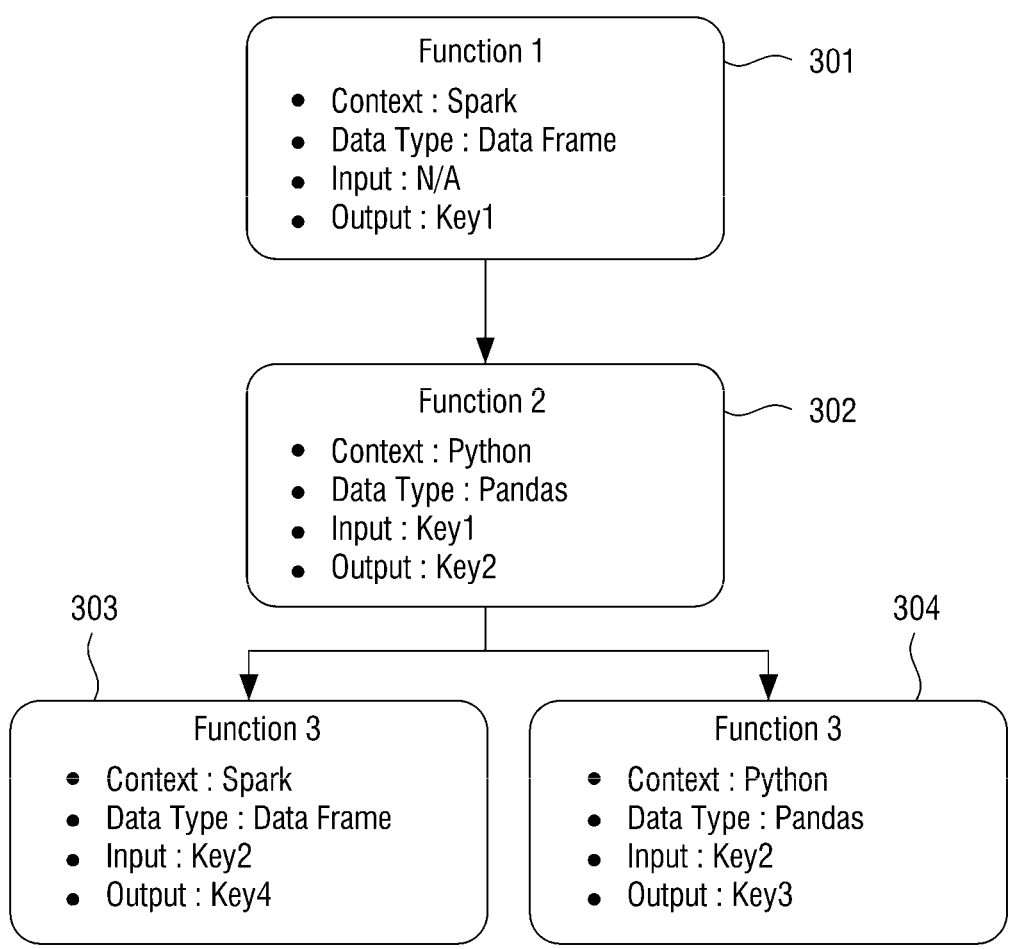
FIGS. 5 to 6 are views for illustrating a key indicating input data of a function and a key indicating output data of a function in the method for executing the heterogeneous language functions according to another embodiment of the inventive concept.
Figure 6:
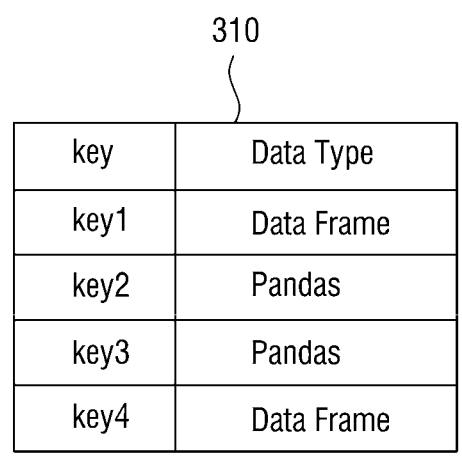

Hereinafter, a key indicating input data of a function and a key indicating output data of a function in a method for executing heterogeneous language functions to another embodiment of the inventive concept will be described in detail with reference to FIGS. 5 to 6.

In a workflow of a method for executing heterogeneous functions according to some embodiments of the inventive concept, an identifier of output data of a preceding function may be the same as an identifier of input data of a subsequent function. Accordingly, it is possible to easily obtain information on execution context of the subsequent function in which each output data is transferred as input data.

For example, in the case of a workflow consisting of four functions as shown, since there is no input data of Function 1 301 which is a starting function, there is no corresponding key. When the subsequent function of Function 1 is Function 2 302, the output data of Function 1 is transferred as input data of Function 2, so that key' corresponding to the output data of Function 1 may be key' corresponding to the input data of Function 2.

As shown, Function 1 is written in Spark and Function 2 is written in Python. Therefore, when data is transferred from Function 1 to Function 2, the data transformation may be performed from a data frame corresponding to Function 1 to Pandas corresponding to Function 2.

In addition, a key of input data of Function 3 303 and 304, which is a subsequent function of Function 2 302, may be key2 which is a key corresponding to the output data of Function 2. When there is a request to execute Function 3 according to some embodiments of the inventive concept, one of a plurality of candidate Functions 303 and 304 may be executed. Each candidate function may be written in a different programming language. In this case, it should be noted that keys of input data of the plurality of candidate functions are the same as keys of the output data of Function 2, but keys of output data of the plurality of candidate functions are different for each candidate function.

A first candidate function 303 of Function 3 is written as Spark, and thus, it constructs a data set using Spark's data frames. Therefore, according to some embodiments of the inventive concept, when data is transferred from Function 2 to Function 3, the data may be converted from a data frame of Pandas to a data frame of Spark. A second candidate function 304 of Function 3 is written in Python, and thus, it is written in the same language as Function 2. Therefore, no data conversion is performed. According to some embodiments of the inventive concept, in response to a request for executing Function 3, a function having a shorter execution time among the plurality of candidate functions 303 and 304 may be executed.

Hereinafter, a method for storing execution context information of each function will be described in detail with reference to FIG. 6. The execution context information of each function may be stored 310 as a value of a key corresponding to output data. As shown in FIG. 6, a value of key1, which is a key corresponding to the output data of Function 1, may be information on a data frame corresponding to a configuration scheme for a data set of Spark, which is a programming language of Function 1. In addition, a value of key2, which is a key corresponding to the output data of Function 2, may be information on Pandas corresponding to a configuration scheme for a data set of Python, which is a programming language of Function 2. Similarly, a value of key3, which is a key corresponding to output data of a candidate function of Function 3 written in Python, may be information on Pandas, and a value of key4, which is a key corresponding to output data of a candidate function of Function 3 written in Spark is information on a data frame.

By storing the key corresponding to the output data together with the execution context information of the function as described above, metadata may be generated for each input data of the subsequent function using each output data as a key during the execution of the workflow. The generated metadata may be converted into a data set suitable for an execution context of a current execution function.

Figure 7:
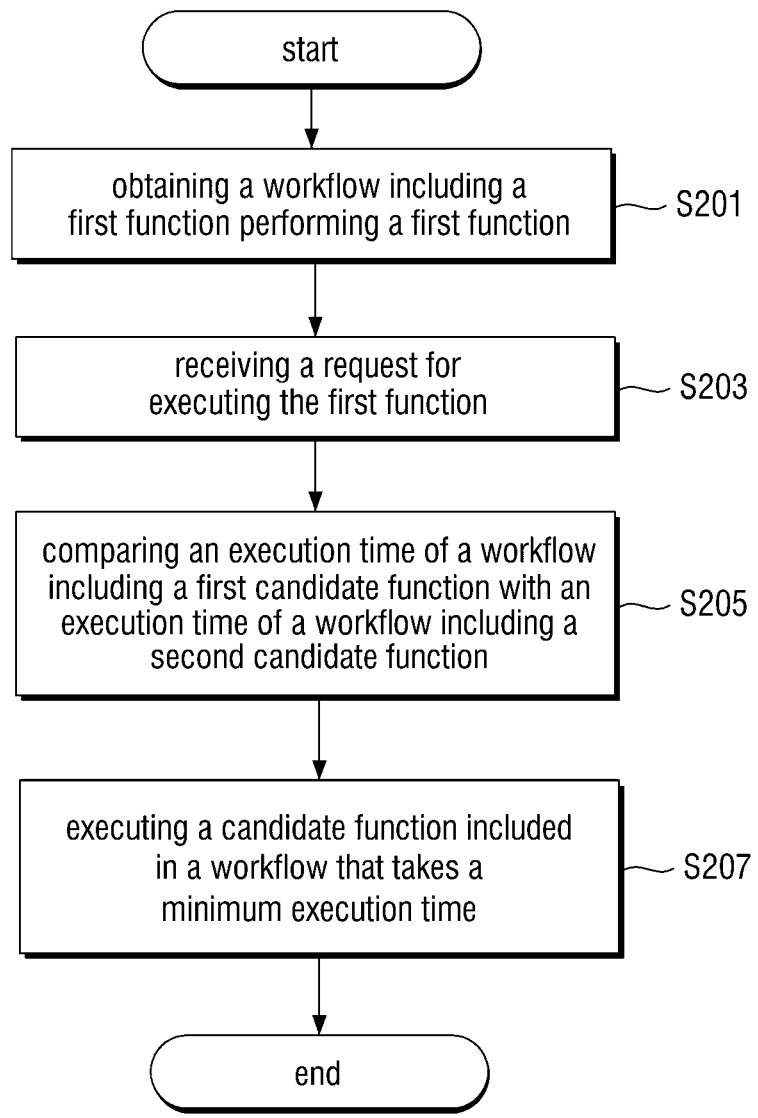
FIG. 7 is a view for illustrating a method for executing an optimal function for performing a specific function according to another embodiment of the inventive concept.

Hereinafter, a method for executing a workflow including an optimal function for performing a specific function according to another embodiment of the inventive concept will be described in detail with reference to FIG. 7.

In step S201, a workflow including a first function performing a first function may be obtained. A language of the first function may not be specified.

In step S203, a request for executing the first function may be received. The first function may be automatically executed according to an execution order of the workflow, or may be executed according to a request for executing the first function.

In step S205, an execution time of a workflow including the first candidate function may be compared with an execution time of a workflow including the second candidate function. Functions of the first candidate function and the second candidate function may be the same as a first function. Also, a programming language of the first candidate function and a programming language of the second candidate function may be different. As the programming language of the first candidate function is different from that of the second candidate function, there may be a performance difference of each function. The difference in performance of the function may be, for example, a difference in execution time, memory usage, resource usage, CPU usage, or storage usage of each function.

In step S207, a candidate function that takes a minimum execution time may be executed. Among the first candidate function and the second candidate function that perform the first function, a function that minimizes an execution time of the workflow may be executed. Alternatively, when efficient memory usage of the function is important, a function that minimizes memory usage among the first candidate function and the second candidate function may be executed.

The performance of a plurality of functions may all be considered to specify candidate functions. For example, when a threshold of execution time, memory usage, and CPU usage of one workflow is specified, the workflow may be composed of a combination of candidate functions that do not exceed the threshold.

Figure 8:
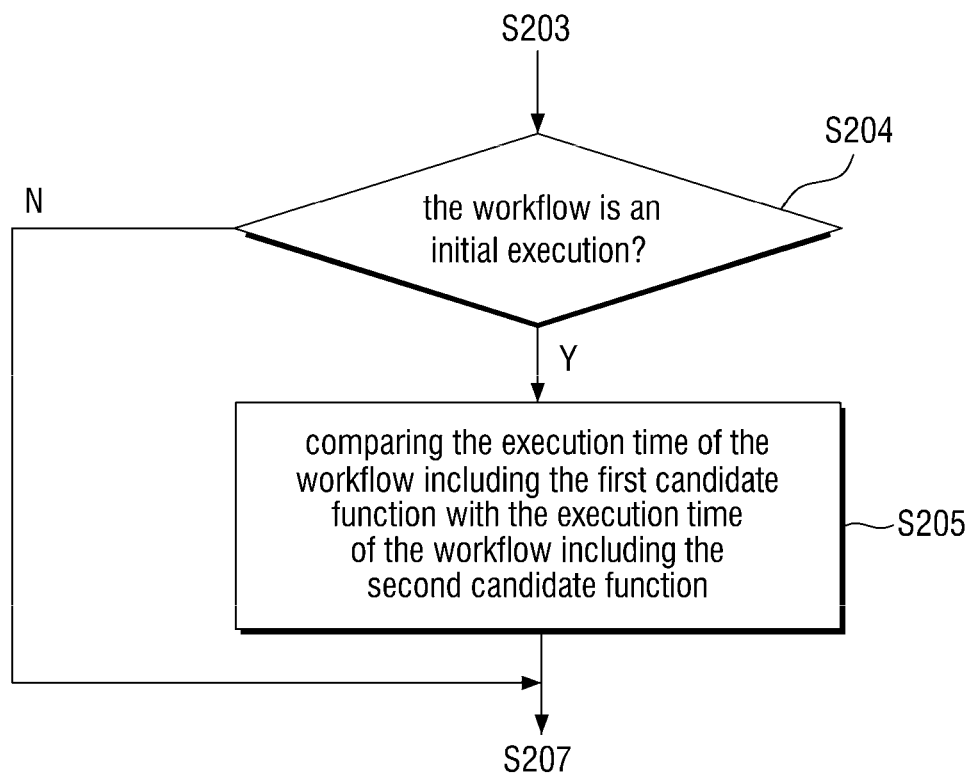
FIG. 8 is a view for illustrating some operations of FIG. 7 in detail.

Referring to FIG. 8, it may be checked whether the workflow is an initial execution in step S204. Then, in step S205, an execution time of a workflow including the first candidate function may be compared with an execution time of a workflow including the second candidate function.

In other words, only in the case of the initial execution of the workflow, a function to be executed may be specified by comparing the performance of the plurality of candidate functions. When the workflow is executed later, the candidate function specified at the initial execution is executed, which saves time and cost for performance comparison between functions.

Figure 9:
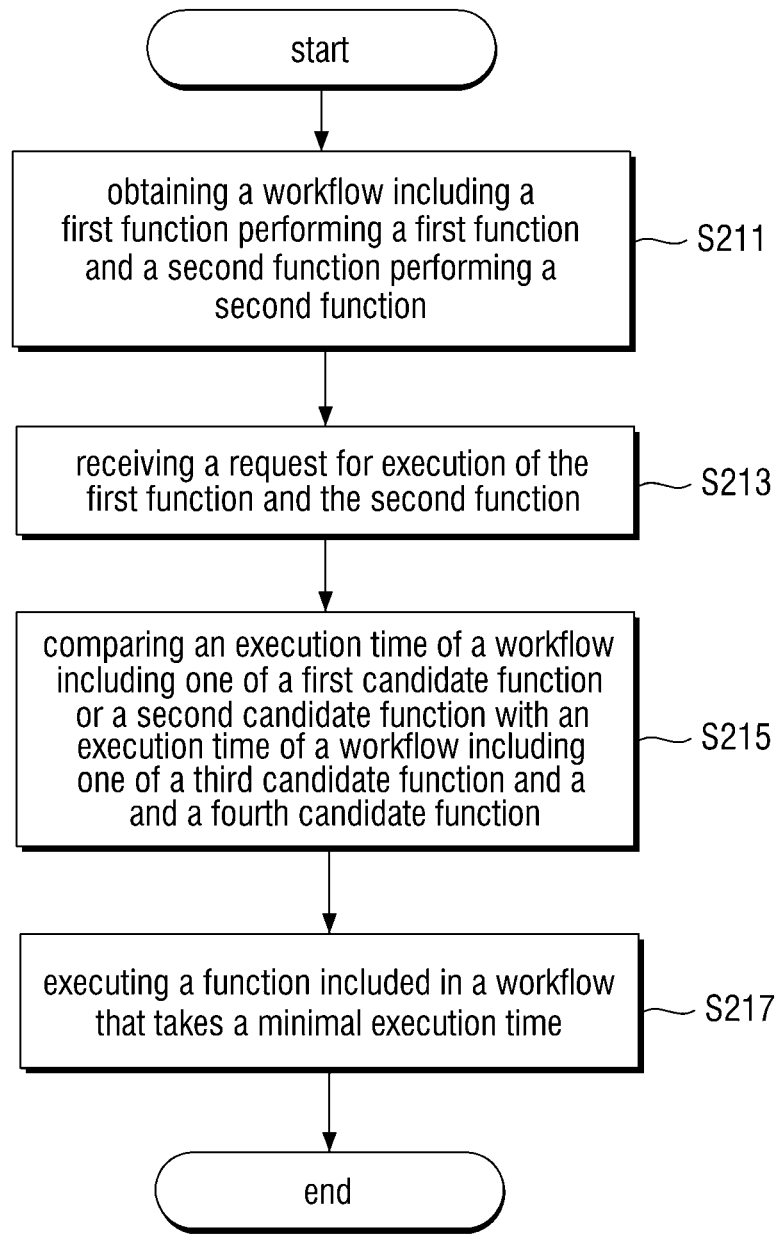
FIG. 9 is a view for illustrating a method for executing an optimal heterogeneous language function for performing a plurality of different functions according to another embodiment of the inventive concept.

Hereinafter, a method for executing a plurality of heterogeneous language functions for performing different functions will be described in detail with reference to FIG. 9.

In step S211, a workflow including a first function performing a first function and a second function performing a second function may be obtained. The first function and the second function may be different functions. In addition, a programming language of the first function and a programming language of the second function may be different.

In step S213, a request for execution of the first function and a request for execution of the second function may be received. Execution of the first function and execution of the second function may be automatically requested in a predetermined order in the workflow.

In step S215, an execution time of a workflow including one of the first candidate function or the second candidate function and an execution time of a workflow including one of a third candidate function and a fourth candidate function may be compared. Functions of the first candidate function and the second candidate function may be the same as a first function. Also, a programming language of the first candidate function and a programming language of the second candidate function may be different. Since the programming language of the first candidate function and the programming language of the second candidate function are different, there may be performance differences such as memory usage or an execution time of each function.

Further, functions of the third candidate function and the fourth candidate function may be the same as a second function. Also, a programming language of the third candidate function and a programming language of the fourth candidate function may be different. Since the programming language of the third candidate function and the programming language of the fourth candidate function are different, there may be performance differences such as memory usage or an execution time of each function.

In step S217, a function included in a workflow that takes a minimal execution time may be executed. In other words, only in the case of the initial execution of the workflow, a function to be executed may be specified by comparing the performance of the plurality of candidate functions. When the workflow is executed later, the candidate function specified at the initial execution is executed, which saves time and cost for performance comparison between functions.

Hereinafter, an example of a method for executing an optimal heterogeneous language function for performing a plurality of different functions according to another embodiment of the inventive concept will be described in detail with reference to FIGS. 10 to 13.

Figure 10:
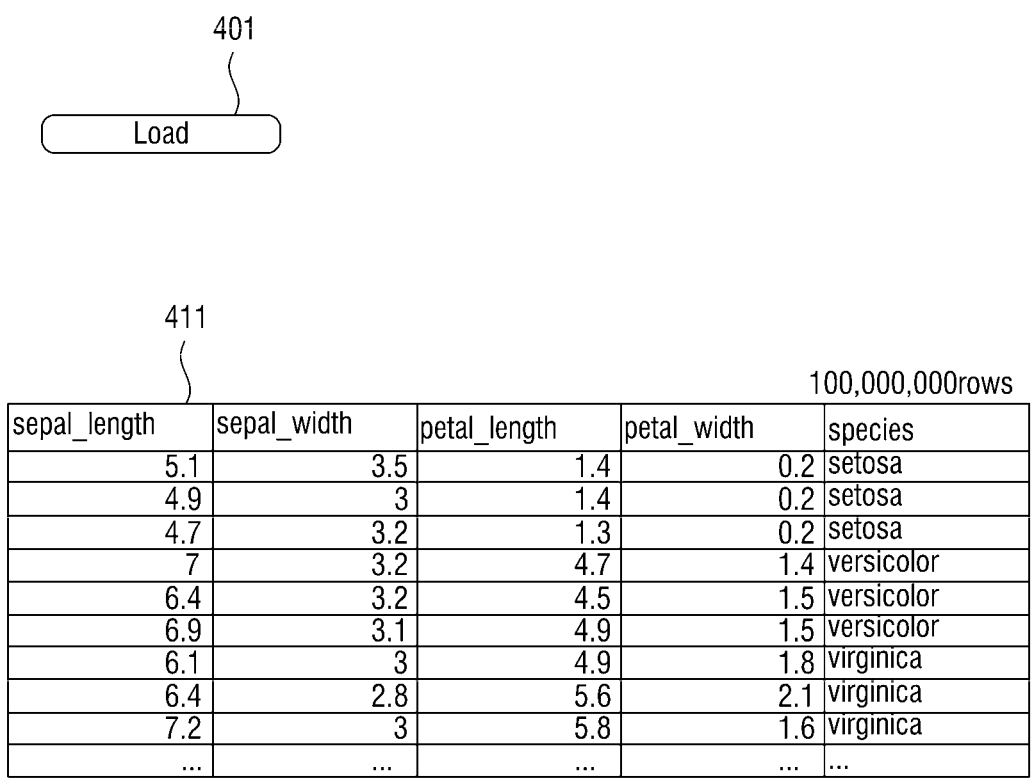
FIGS. 10 to 13 are diagrams for explaining an example of the method for executing the optimal heterogeneous language function for performing the plurality of different functions according to another embodiment of the inventive concept.

As shown in FIG. 10, a data set may be loaded first (401). The loaded data 411 may be a large amount of data of 100,000,000 rows.

Figure 11:
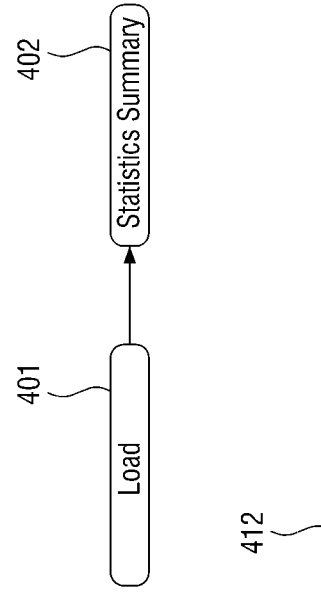

Thereafter, as shown in FIG. 11, the loaded data set may be operated using a statistical function 402. In this case, since an operation is repeated for each category of the data 412, an efficient workflow should be executed through a parallel operation for each category. Therefore, the statistical function may be a function written as Spark capable of parallel distributed processing.

Figure 12:
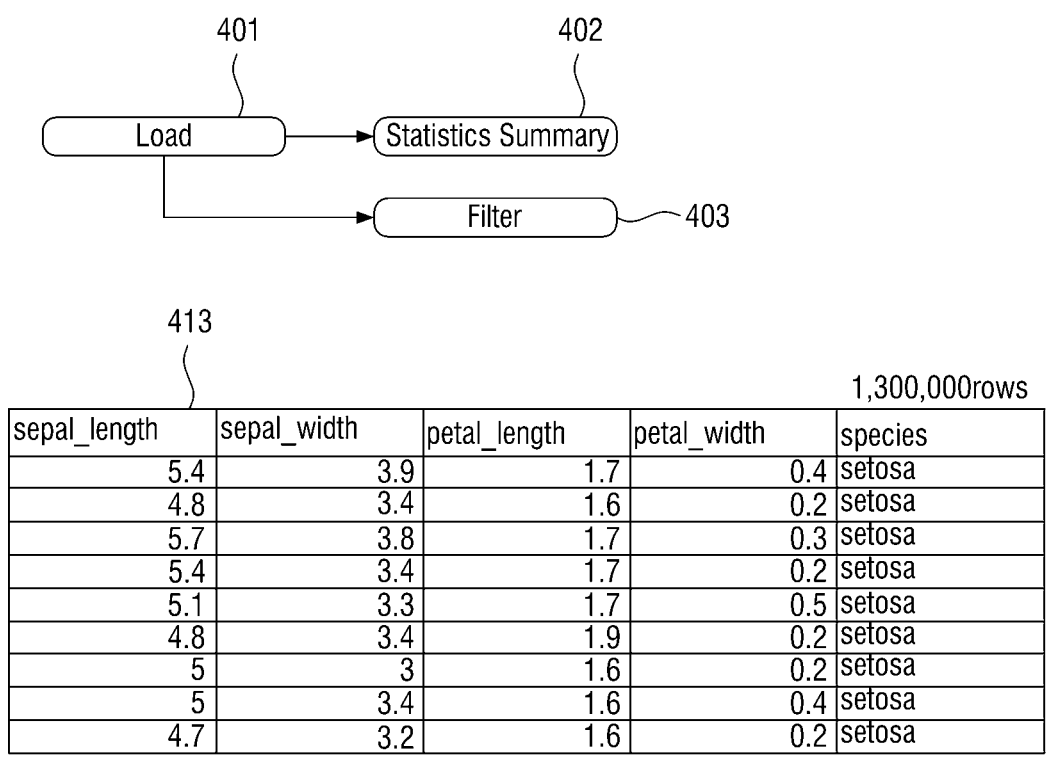

On the other hand, in the case of a data filtering function 403 as shown in FIG. 12, since no parallel operation is required, a function written in the same programming language as a previous function may be executed. When it is not possible to achieve the performance improvement by switching a programming language of an execution function, a function written in the same programming language as the previous execution function may be executed to reduce computing operations required to convert data formats between programming languages.

Figure 13:
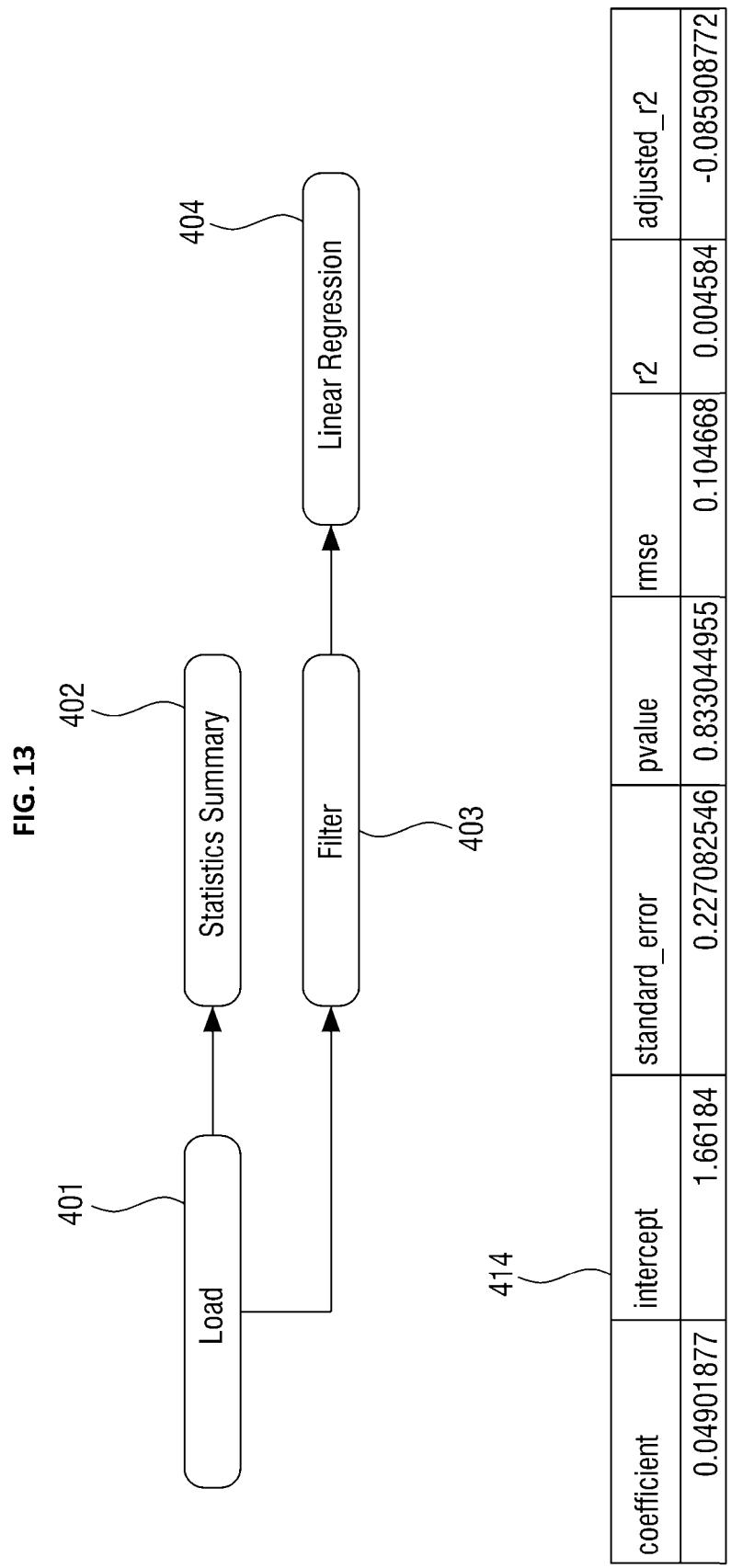

Referring to FIG. 13, when executing a function 404 that creates a linear regression analysis model using purified data through the filtering function 403, the use of Python functions rather than Spark may be advantageous for performance because an amount of data 414 has been reduced. Thus, an output data format of the previous execution function 403 may be a Spark data frame and an input data format of the current execution function 404 may be Pandas. Therefore, a data set conversion process may be preceded before the linear regression model generation function 404 is executed.

Figure 14:
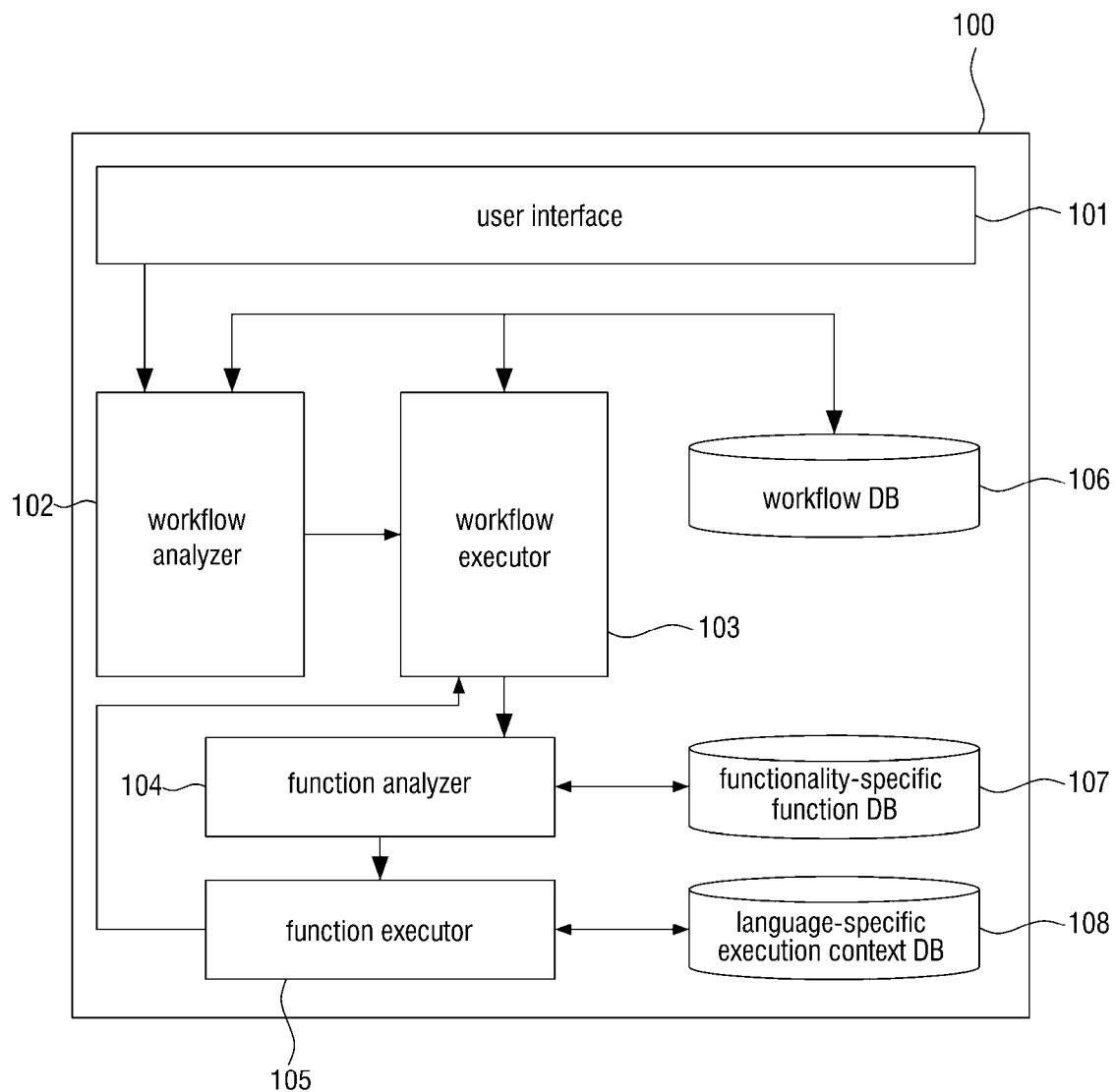
FIG. 14 is a block diagram of a device for executing heterogeneous language functions according to another embodiment of the inventive concept.

FIG. 14 is a block diagram of a device for executing heterogeneous language functions according to another embodiment of the inventive concept.

A device 100 for executing heterogeneous language functions according to an embodiment of the inventive concept includes a workflow analyzer 102, a workflow executor 103, and a language-specific execution context DB 108. According to some embodiments, it may further include a user interface 101, a function analyzer 104, a function executor 105, a functionality-specific function DB 107, and a workflow DB 106.

The user interface 101 may receive a workflow from the outside and change the workflow by receiving a user input. In addition, information on an executed workflow and functions included in the workflow may be output.

The workflow analyzer 102 may obtain a workflow from the workflow DB 106 and analyze an execution order of a plurality of functions included in the obtained workflow. In addition, it is possible to analyze information on a language and a configuration scheme for a data set used in the plurality of functions. In addition, by analyzing the connection relationship between functions, it is possible to analyze in advance a data conversion function depending on a programming language of the preceding function and the subsequent function.

The workflow executor 103 may obtain information on the workflow analyzed from the workflow analyzer 102 and obtain the execution target workflow from the workflow DB 106. In addition, according to some embodiments, the function analyzer 104 may request performance analysis of a plurality of candidate functions only in the case of an initial execution of the workflow.

The function analyzer 104 may analyze the performance of a candidate function, which is a function that is in the current execution order from the workflow executor 103. The candidate function may be obtained from the functionality-specific function DB 107, and each of the plurality of candidate functions having one function may be written in different programming languages.

The function executor 105 may obtain and execute an execution target candidate function from the function analyzer 104. In addition, when a programming language of a function to be executed currently and a programming language of a preceding function are different, information on a configuration scheme for a language-specific data set may be obtained from the language-specific execution context DB 108. This allows data set conversion before function execution.

Figure 15:
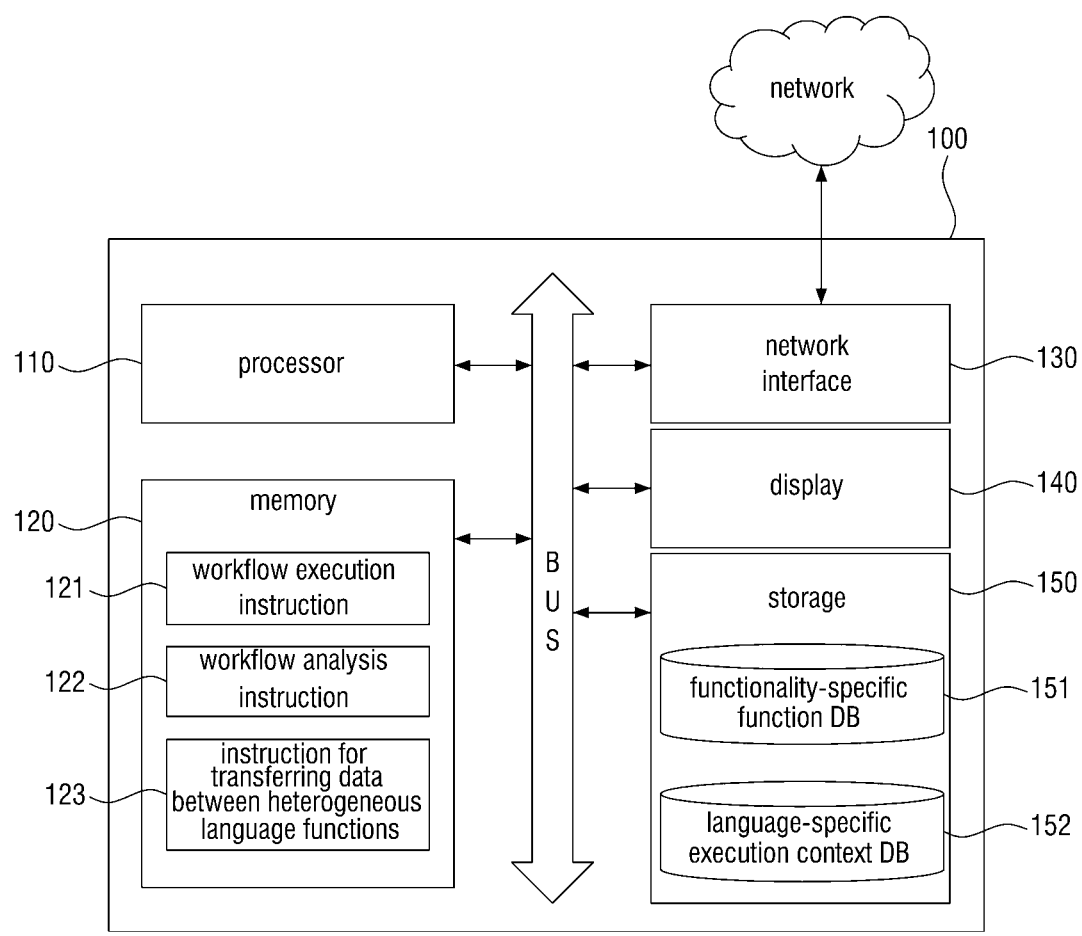
FIG. 15 is a hardware block diagram of the device for executing the heterogeneous language functions according to another embodiment of the inventive concept.

As shown in FIG. 15, a computing device 100 that performs a method for executing heterogeneous language functions in accordance with another embodiment of the inventive concept may include a processor 110, a memory 120, a storage 150, and a network interface 130. In some embodiments, it may further include a system bus and a display 140.

One or more instructions 121, 122, and 123 loaded and stored in the memory 120 are executed by the processor 110. It should be noted that the computing device 100 performing the method for executing the heterogeneous language functions according to the present embodiment may perform the method for executing the heterogeneous language functions described with reference to FIGS. 1 to 13.

The network interface 130 may receive data related to an independent variable, data related to a dependent variable, discrete probability distribution algorithm data, and optimization algorithm data. The received information may be stored in the storage 150.

The storage 150 may store a functionality-specific function DB 151 and a language-specific execution context DB 152.

The one or more instructions may include a workflow execution instruction 121, a workflow analysis instruction 122, and a data transfer instruction 123 between heterogeneous language functions.

In an embodiment, the workflow execution instruction 121 is executed, and in response to receiving a request to execute a first function, one of a first candidate function performing the first function and a second candidate function performing the second function may be executed. In another embodiment, a candidate function included in a workflow that takes a minimum execution time may be executed.

In an embodiment, by executing the workflow analysis instruction 122, an execution time of a workflow including the first candidate function and an execution time of a workflow including the second candidate function may be compared.

In an embodiment, the data transfer instruction 123 between the heterogeneous language functions is executed, and in response to completing execution of the first function, output data of the first function may be converted into a data set of the second programming language and the converted data set may be transferred as input data of the second function.

The embodiments of the present invention described above may be conducted by executing a computer program which is implemented as a computer-readable code. The computer program may be transmitted from a first computing device to a second computing device via a network such as Internet and may be installed on the second computing device, and thus, the computer program may be used in the second computing device. The second computing device may comprise all of available computing devices, such as a server device, a physical server included in server pool for cloud service, and a desktop PC.

The computer program may be stored in a computer-readable medium including DVD-ROM, flash memory, or etc.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method for executing heterogeneous language functions, the method being performed by a computing device, and comprising:
   obtaining a workflow defined to perform a plurality of functional units in sequence, wherein each functional unit included in the plurality of functional units corresponds to a plurality of candidate functions implemented in different programming languages; and
   executing the workflow by selecting an optimal combination among all possible combinations of the candidate functions for execution of the workflow,
   wherein, if necessary, output data of one execution function is converted and such converted data is transferred as input data for a subsequent execution function when the workflow is executed; and
   wherein the executing the workflow by selecting an optimal combination comprises:
   determining whether the parallel distributed processing is needed for the execution function based on the amount of data of the input of the execution function;
   if the result of the determining indicates that the parallel distributed processing is needed for the execution function, selecting the execution function from the plurality of candidate functions written in a language supporting parallel distributed processing, as the execution function;
   if the result of the determining indicates that the parallel distributed processing is not needed for the candidate function, selecting the execution function written in the same programming language as the previous execution function, from the plurality of candidate functions;
   repeating, for every execution function in the workflow, the determining, the selecting the execution function from the plurality of candidate functions written in a language supporting parallel distributed processing and the selecting the execution function written in the same programming language as the previous execution function;
   storing, for each execution function in the workflow, the first key of the input of the execution function, the second key of the output of the execution function, wherein the first key is a key of the information of the data type of the input of the execution function, and the second key is a key of the information of the data type of the output of the execution function;
   executing the first execution function; and
   selectively transferring the output data of the first execution function, according to the result of the comparing between the information of the second key of the first execution function and the information of the first key of the second execution function which is subsequent execution function of the first function.

2. The method of claim 1, wherein executing the workflow comprises comparing an execution time of a workflow including a first candidate function with an execution time of a workflow including a second candidate function, and executing a workflow calling a candidate function that takes a minimum execution time.

3. The method of claim 2, wherein executing the workflow comprises, only in the case of an initial first time execution of the workflow, comparing the execution time of the workflow including the first candidate function with the execution time of the workflow including the second candidate function, and executing a candidate function included in a workflow that takes the minimum execution time.

4. The method of claim 1, wherein obtaining the workflow comprises obtaining a workflow that includes a call for a functionality to perform a first function and a call for a function to perform a second functionality,
   wherein executing the candidate function included in the workflow comprises executing one of a first candidate function and a second candidate function performing the first functionality, and executing one of a third candidate function and a fourth candidate function performing the second functionality, wherein a programming language of the first candidate function and a programming language of the second candidate function are different, and a programming language of the third candidate function and a programming language of the fourth candidate function are different.

5. The method of claim 4, wherein executing one of the third candidate function and the fourth candidate function comprises obtaining a workflow including one of the first candidate function or the second candidate function and one of the third candidate function or the fourth candidate function, wherein the obtained workflow takes a minimum execution time.

6. The method of claim 5, wherein obtaining the workflow including one of the first candidate function or the second candidate function and one of the third candidate function or the fourth candidate function comprises obtaining the workflow including one of the first candidate function or the second candidate function and one of the third candidate function or the fourth candidate function by using an optimization algorithm.

7. A computing device, comprising:
   a memory into which a heterogeneous function execution program is loaded; and
   a processor that executes the heterogeneous language function execution program loaded into the memory,
   wherein the heterogeneous language function execution program comprises:
   an instruction to obtain a workflow defined to perform a plurality of functional units in sequence, wherein each functional unit included in the plurality of functional units corresponds to a plurality of candidate functions implemented in different programming languages; and
   an instruction to execute the workflow by selecting an optimal combination among all possible combinations of the candidate functions for execution of the workflow,
   wherein, if necessary, output data of one execution function is converted and such converted data is transferred as input data for a subsequent execution function when the workflow is executed; and
   wherein the instruction to execute the workflow by selecting an optimal combination comprises:
   an instruction to determine whether the parallel distributed processing is needed for the execution function based on the amount of data of the input of the execution function;
   an instruction to select the execution function from the plurality of candidate functions written in a language supporting parallel distributed processing, as the execution function, if the result of the determining indicates that the parallel distributed processing is needed for the candidate execution function; and
   an instruction to select a candidate the execution function written in the same programming language as the previous execution function, from the plurality of candidate functions, if the result of the determining indicates that the parallel distributed processing is not needed for the candidate function;

an instruction to repeat, for every execution function in the workflow, to determine, to select the execution function from the plurality of candidate functions written in a language supporting parallel distributed processing and to select the execution function written in the same programming language as the previous execution function;

an instruction to store, for each execution function in the workflow, the first key of the input of the execution function, the second key of the output of the execution function, wherein the first key is a key of the information of the data type of the input of the execution function, and the second key is a key of the information of the data type of the output of the execution function;

an instruction to execute the first execution function; and an instruction to selectively transfer the output data of the first execution function, according to the result of the comparing between the information of the second key of the first execution function and the information of the first key of the second execution function which is subsequent execution function of the first function.

8. The device of claim 7, wherein the instruction to obtain the workflow comprises an instruction to obtain a workflow including a call for a function to perform a first functionality and a call for a function to perform a second functionality, wherein an instruction to execute the candidate function included in the workflow comprises an instruction to execute one of a first candidate function and a second candidate function performing the first functionality, and to execute one of a third candidate function and a fourth candidate function performing the second functionality, wherein a programming language of the first candidate function and a programming language of the second candidate function are different, and a programming language of the third candidate function and a programming language of the fourth candidate function are different.

9. The method of claim 8, wherein the instruction to execute one of the third candidate function and the fourth candidate function comprises an instruction to obtain a workflow including one of the first candidate function or the second candidate function and one of the third candidate function or the fourth candidate function, wherein the obtained workflow takes a minimum execution time.

10. The device of claim 9, wherein the instruction to obtain the workflow including one of the first candidate function or the second candidate function and one of the third candidate function or the fourth candidate function, wherein the obtained workflow takes the minimum execution time, comprises an instruction to obtain the workflow including one of the first candidate function or the second candidate function and one of the third candidate function or the fourth candidate function by using an optimization algorithm.

11. The device of claim 7, wherein the instruction to execute the workflow comprise comparing an execution time of a workflow including a first candidate function with an execution time of a workflow including a second candidate function, and executing a workflow calling a candidate function that takes a minimum execution time.

12. The device of claim 11, wherein the instruction to execute the workflow comprise an instruction, only in the case of an initial first time execution of the workflow, to compare the execution time of the workflow including the first candidate function with the execution time of the workflow including the second candidate function, and to execute a candidate function included in a workflow that takes the minimum execution time.

* * * * *